United States Patent
Koishi

(10) Patent No.: US 8,864,989 B2
(45) Date of Patent: Oct. 21, 2014

(54) UPWARD-TYPE FILTERING APPARATUS CHARACTERIZED IN LAMINATING METHOD OF FILTERING MATERIAL

(76) Inventor: Kazunori Koishi, Kai (JP)

( * ) Notice: Subject to any disclaimer, the term of this patent is extended or adjusted under 35 U.S.C. 154(b) by 367 days.

(21) Appl. No.: 13/264,038

(22) PCT Filed: Apr. 11, 2011

(86) PCT No.: PCT/JP2011/002115
§ 371 (c)(1),
(2), (4) Date: Dec. 19, 2011

(87) PCT Pub. No.: WO2012/042700
PCT Pub. Date: Apr. 5, 2012

(65) Prior Publication Data
US 2012/0138524 A1 Jun. 7, 2012

(30) Foreign Application Priority Data

Sep. 28, 2010 (JP) .............................. 2010-006423 U
Dec. 7, 2010 (JP) ................................ 2010-272106

(51) Int. Cl.
| | | |
|---|---|---|
| *B01D 24/16* | (2006.01) | |
| *C02F 1/00* | (2006.01) | |
| *C02F 1/28* | (2006.01) | |
| *C02F 1/72* | (2006.01) | |
| *C02F 3/02* | (2006.01) | |

(52) U.S. Cl.
CPC .............. *C02F 1/004* (2013.01); *B01D 24/165* (2013.01); *C02F 1/281* (2013.01); *C02F 1/722* (2013.01); *C02F 3/02* (2013.01); *C02F 2303/16* (2013.01)
USPC ........... 210/274; 210/289; 210/290; 210/291; 210/352

(58) Field of Classification Search
CPC .... B01D 24/16; B01D 24/165; B01D 24/167; B01D 24/4694; C02F 1/004; C02F 1/281; C02F 2303/16; C02F 3/02; C02F 1/722
USPC ................... 210/274, 289, 290, 291, 350, 352
See application file for complete search history.

(56) References Cited

U.S. PATENT DOCUMENTS 2,101,961 A * 12/1937 Slidell ............................ 210/290
4,139,473 A * 2/1979 Alldredge ...................... 210/279
(Continued)

FOREIGN PATENT DOCUMENTS

| JP | 44-22059 Y1 | 9/1969 |
|---|---|---|
| JP | 45-8312 B1 | 3/1970 |

(Continued)

*Primary Examiner* — Matthew O Savage
(74) *Attorney, Agent, or Firm* — Kratz, Quintos & Hanson, LLP

(57) ABSTRACT

[Object] It is an object of the present invention to provide a filtering apparatus capable of efficiently filtering a large volume of to-be filtered water, in which its filtering material is less prone to be clogged, and even if the filtering material is clogged, it is possible to wash the filtering material.

[Solving Means] An upward-type filtering apparatus (1) includes a pressure container (2) and a filtering material (3) made of gravels, filtering sands or particles. The filtering material (3) includes a filtering portion (9) having a plurality of layers which are laminated on one another such that particle diameters thereof are gradually reduced from a lower portion to an upper portion of the filtering portion, and a filtering sand flowing-out preventing portion (10) including a plurality of layers which located on the filtering portion and which are laminated on one another on the filtering portions (9) such that particle diameters thereof are gradually increased from the lower portion to the upper portion of the filtering sand flowing-out preventing portion. The filtering material (3) is charged into the pressure container (2) up to a ceiling thereof, or the filtering material (3) is forcibly pressed down by a retainer member (26) or a weight from above so as to suppress a case where the filtering material (3) floats up. Raw water is sent from a lower portion of the pressure container (2) under pressure of 0.05 MPa or higher.

12 Claims, 6 Drawing Sheets

(56) References Cited

U.S. PATENT DOCUMENTS 4,246,119 A * 1/1981 Alldredge .................. 210/279
4,643,833 A * 2/1987 Aulich et al. ................ 117/35

FOREIGN PATENT DOCUMENTS

| JP | 2001-137616 A | 5/2001 |
| JP | 3119066 U | 1/2006 |

* cited by examiner

UPWARD-TYPE FILTERING APPARATUS CHARACTERIZED IN LAMINATING METHOD OF FILTERING MATERIAL

TECHNICAL FIELD

The present invention relates to a filtering apparatus for filtering water to be filtered ("to-be filtered water", hereinafter) containing turbid materials, and more particularly, to a filtering apparatus for removing turbid materials having relatively large particle diameters from raw water obtained from river, lake or dam, and to a filtering apparatus for removing fine turbid materials such as *cryptosporidium* from treated water which is treated by a slow sand filter bed or a rapid sand filter bed.

BACKGROUND TECHNIQUE

A filter bed or a filtering apparatus which filters to-be filtered water containing turbid materials is provided with filtering material for capturing turbid materials. As the filtering material, there are relatively expensive film and special filter element, but there are also inexpensive filtering materials such as gravels and filtering sands, and they can repeatedly be used if they are washed. The rapid sand filter bed or the slow sand filter bed provided in a water purification plant includes filtering materials such as the gravels and filtering sands. The filtering material of the rapid sand filter bed includes layers of gravels laminated such that particle diameters become smaller upward, and a layer of filtering sands laminated on the layer of gravels and having average particle diameters of 0.45 to 0.7 mm. Flocculating agent is injected into raw water taken from river, lake or a dam, turbid materials are removed in a sedimentation basin to some extent, bactericidal sodium hypochlorite or chlorine is injected and then, the water is filtered downward in the rapid sand filter bed. The filtering material of the slow sand filter bed also includes a layer of gravels laminated such that particle diameters thereof become smaller upward, and a layer of filtering sands laminated on the layer of gravels and having average particle diameters of 0.3 to 0.45 mm. In the slow sand filter bed also, like the rapid sand filter bed, raw water is filtered downward, but a sedimentation basin is not required, and sodium hypochlorite or chlorine is not injected. It is known that a biological film made of microbe is formed in the layer of the filtering sands, organic matters in water are decomposed and delicious purified water can be obtained. An upward-type filtering apparatus which filters raw water upward through filtering materials is also known and is described in a patent document 1 for example. The filtering materials of the upward-type filtering apparatus include layers of gravels laminated such that particle diameters become smaller upward, and a layer of filtering sands laminated on the layer of gravels, and raw water is filtered upward through the filtering material.

PRIOR ART DOCUMENT

Patent Document

Patent Document 1: Japanese Patent No. 3769561

SUMMARY OF THE INVENTION

Problem to be Solved by the Invention

As described above, according to the slow sand filter bed, delicious purified water can be obtained by the biological film, the rapid sand filter bed can efficiently filter purified water, and both of them are excellent. The upward-type filtering apparatus can efficiently capture turbid materials and thus is excellent. However, the filter bed and the upward-type filtering apparatus have also problems. In the case of the slow sand filter bed and the rapid sand filter bed, the uppermost layer of the filtering material is provided with the layer of filtering sands of minimum particles, and the filter bed filters water downward. Therefore, captured turbid materials are centered in the uppermost layer. Therefore, there is a problem that the uppermost layer is prone to be clogged early. To clear the clog, in the slow sand filter bed, it is necessary to manually scrape off the filtering sands of the clogged uppermost layer, and this increases maintenance cost. In the rapid sand filter bed, it is necessary to vigorously issue purified water from below the filtering material, and to carry out so-called backwash and a large amount of purified water is wastefully used. That is, the slow sand filter bed and the rapid sand filter bed have a problem that a washing operation cost of the filtering material increases. Further, a filtering speed of these filter beds is slow, and the filtering speed of a relatively high speed rapid sand filter bed is as slow as about 120 m per a day. That is, there is a problem that the filtering efficiency is low. If an attempt is made to obtain a large volume of purified water, a large amount of filter beds are required. In the case of the upward-type filtering apparatus, water is filtered upward through filtering materials which are laminated on one another such that their particle diameters become smaller upward. Therefore, turbid materials having different particle diameters are captured in the respective layers. Therefore, it is relatively less prone to be clogged and this is excellent in terms of this point. However, if the filtering speed is increased, the uppermost layer of the filtering sands soars and thus, the filtering speed can not be increased. That is, it can not be said that the filtering efficiency is high. Further, when the filtering material is to be washed, it is necessary that the laminating order of the layers which constitute the filtering material is not changed, and its maintenance is not easy. Furthermore, the filter bed and the upward-type filtering apparatus have a problem that *cryptosporidium* can not reliably be removed. The *cryptosporidium* is a protozoa and if it is mixed in purified water and people drinks it, this causes diarrhea, but its size is as small as 3 to 8 μm, and the *cryptosporidium* can not reliably be captured by the layer of the filtering sands.

It is an object of the present invention to provide a filtering apparatus for solving the above-described problems. More specifically, it is an object of the invention to provide a filtering apparatus capable of efficiently filtering a large volume of water although the filtering apparatus is inexpensive, and in which its filtering material is less prone to be clogged, and even if the filtering material is clogged, the filtering material can easily be washed. It is also an object of the invention that by appropriately selecting a filtering material, the filtering apparatus has a variety of potential applications. That is, the filtering apparatus may efficiently remove only relatively large turbid materials from raw water obtained from river, lake or dam, or the filtering apparatus may filter water having relatively small amount of turbid materials and may substantially completely remove *cryptosporidium*. It is also an object of the invention that when the filtering material is clogged, the filtering material can efficiently be washed. Further, it is also an object of the invention that in the filtering apparatus, a biological film is efficiently formed in the filtering material, organic matter can efficiently be decomposed, and delicious purified water can be obtained.

Means for Solving Problems

To achieve the above object, the present invention provides an upward-type filtering apparatus comprising a pressure container and filtering material which is placed in the pressure container and which is made of gravels, filtering sands and particles, in which if to-be filtered water is supplied from a lower portion of the pressure container and is filtered upward, filtered water is obtained from an upper portion of the pressure container. The filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion. The filtering material is charged into the pressure container such that the filtering material reaches a ceiling of the pressure container, or the filtering material is forcibly pressed down by a retainer member or a weight from above so as to suppress a case where the filtering material floats up by water pressure. The to-be filtered water is supplied into the pressure container under water pressure of 0.05 MPa or higher. Air bubbles having diameters of 80 μm or less are mixed into the to-be filtered water, and they are supplied to the pressure container.

To achieve the above object, an invention described in claim 1 provides an upward-type filtering apparatus comprising a pressure container and filtering material which is placed in the pressure container and which is made of gravels, filtering sands and particles, in which to-be filtered water is supplied from a lower portion of the pressure container and is filtered upward, filtered water is obtained from an upper portion of the pressure container, wherein the filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion, the filtering material is charged into the pressure container such that the filtering material reaches a ceiling of the pressure container, and the to-be filtered water is supplied into the pressure container under water pressure of 0.05 MPa or higher.

An invention described in claim 2 provides an upward-type filtering apparatus comprising a pressure container and filtering material which is placed in the pressure container and which is made of gravels, filtering sands and particles, in which to-be filtered water is supplied from a lower portion of the pressure container and is filtered upward, filtered water is obtained from an upper portion of the pressure container, wherein the filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion, the to-be filtered water is supplied into the pressure container under water pressure of 0.05 MPa or higher, and the filtering material is forcibly pressed down by a retainer member or a weight from above so as to suppress a case where the filtering material floats up by water pressure.

According to an invention described in claim 3, in the upward-type filtering apparatus according to claim 1 or 2, a minimum particle layer of the filtering portions comprise a layer of filtering sands having particle diameters of 0.1 to 0.5 mm.

According to an invention described in claim 4, in the upward-type filtering apparatus according to claim 1 or 2, a minimum particle layer of the filtering portions comprise a layer of filtering sands having particle diameters of 1 to 50 μm.

According to an invention described in claim 5, in the upward-type filtering apparatus according to any one of claims 1 to 4, air bubbles of diameters of 80 μm or less are mixed into the to-be filtered water, and they are supplied to the pressure container.

According to an invention described in claim 6, in the upward-type filtering apparatus according to any one of claims 1 to 5, a lower portion of the pressure container is provided with a to-be filtered water supply pipe having a supply pipe valve and with a drain pipe having a drain pipe valve, an upper portion of the pressure container is provided with a water pipe having a water pipe valve, a large number of holes are formed in a washing pipe, the washing pipe is embedded in a layer which is adjacent to a lower side of the minimum particle layer of the filtering portion, if the supply pipe valve and the water pipe valve are opened and the drain pipe valve is closed, and if to-be filtered water is supplied from the to-be filtered water supply pipe, filtered water which was filtered by the filtering material is supplied from the water pipe into outside, if the supply pipe valve and the water pipe valve are closed and the drain pipe valve is opened, and if to-be filtered water is supplied from the washing pipe, the filtering material is washed with the to-be filtered water and the to-be filtered water is drained from the drain pipe.

According to an invention described in claim 7, in a filtering apparatus in which first and second upward-type filters each comprising the upward-type filtering apparatus according to any one of claims 1 to 5 are combined, if filtered water is supplied from upper portions of the first and second upward-type filters, the filtering materials are back washed and washing water is drained from lower portions of the first and second upward-type filters, a lower portion of the first upward-type filter is provided with a first to-be filtered water supply pipe having a first supply pipe valve and with a first drain pipe having a first drain pipe valve, an upper portion of the first upward-type filter is provided with a first water pipe, a lower portion of the second upward-type filter is provided with a second to-be filtered water supply pipe having a second supply pipe valve and with a second drain pipe having a second drain pipe valve, an upper portion of the second upward-type filter is provided with a second water pipe, to-be filtered water is supplied from the first and second to-be filtered water supply pipes under water pressure of 0.05 MPa or higher, the first and second water pipes are in communication with each other, and a water main pipe having a water main pipe valve is connected to the first and second water pipes.

According to an invention described in claim 11, in the upward-type filtering apparatus according to claim 2, a lower portion of the pressure container is provided with a to-be filtered water supply pipe having a supply pipe valve and with a drain pipe having a drain pipe valve, an upper portion of the pressure container is provided with a water pipe having a water pipe valve, a large number of holes are formed in a washing pipe, the washing pipe is embedded in a layer which is adjacent to a lower side of a minimum particle layer of the filtering portion, if the supply pipe valve and the water pipe valve are opened and the drain pipe valve is closed, and if to-be filtered water is supplied from the to-be filtered water supply pipe, filtered water which was filtered by the filtering material is supplied from the water pipe into outside, and if the supply pipe valve and the water pipe valve are closed and the drain pipe valve is opened, and if to-be filtered water is supplied from the washing pipe, the filtering material is washed with the to-be filtered water and the to-be filtered water is drained from the drain pipe.

According to an invention described in claim 12, in a filtering apparatus in which first and second upward-type filters each comprising the upward-type filtering apparatus according to claim 2 are combined, if filtered water is supplied from upper portions of the first and second upward-type filters, the filtering materials are back washed and washing water is drained from lower portions of the first and second upward-type filters, a lower portion of the first upward-type filter is provided with a first to-be filtered water supply pipe having a first supply pipe valve and with a first drain pipe having a first drain pipe valve, an upper portion of the first upward-type filter is provided with a first water pipe, a lower portion of the second upward-type filter is provided with a second to-be filtered water supply pipe having a second supply pipe valve and with a second drain pipe having a second drain pipe valve, an upper portion of the second upward-type filter is provided with a second water pipe, to-be filtered water is supplied from the first and second to-be filtered water supply pipes under water pressure of 0.05 MPa or higher, the first and second water pipes are in communication with each other, and a water main pipe having a water main pipe valve is connected to the first and second water pipes.

Effect of the Invention

As described above, according to the present invention, the upward-type filtering apparatus includes a pressure container and filtering material which is placed in the pressure container and which is made of gravels, filtering sands and particles, in which to-be filtered water is supplied from a lower portion of the pressure container and is filtered upward, filtered water is obtained from an upper portion of the pressure container. The filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion. Therefore, when to-be filtered water including turbid materials is filtered by the filtering portion, the to-be filtered water is first filtered by the layer having large particle diameters and then, the to-be filtered water is sequentially filtered by layers having smaller particle diameters. Turbid materials are captured by the layers, and the water is efficiently filtered using the entire filtering portion.

According to this, the filtering material is less prone to be clogged. The filtering material is charged into the pressure container such that the filtering material reaches a ceiling of the pressure container, and the to-be filtered water is supplied into the pressure container under water pressure of 0.05 MPa or higher. Therefore, since the to-be filtered water is supplied under high pressure, the filtering speed can be increased, and even if turbid materials are accumulated in the filtering material, it is possible to stably filter water. That is, a large volume of filtered water can be obtained over the long term. At that time, since the filtering material reaches the ceiling of the pressure container, it is possible to suppress a case where the filtering material floats up by water pressure, and the filtering material does not soar in the water. Therefore, even if the water pressure is sufficiently increased, it is possible to filter water. According to the other invention, the filtering material is forcibly pressed down by a retainer member or a weight from above so as to suppress a case where the filtering material floats up by water pressure. Therefore, according to this invention, like the invention in which the filtering material is charged into the pressure container such that the filtering material reaches the ceiling of the pressure container, the filtering material does not soar in the water and it is possible to stably filter water.

According to the other invention, in the upward-type filtering apparatus according to claim 1 or 2, a minimum particle layer of the filtering portions comprise a layer of filtering sands having particle diameter of 0.1 to 0.5 mm. According to this, it is possible to directly filter raw water taken from river, lake or dam, and the upward-type filtering apparatus can capture turbid materials having relatively large particle diameters. If water is filtered by such an upward-type filtering apparatus, even if raw water has a relatively large amount of turbid materials, it is possible to obtain filtered water having turbidity of about 10 degrees. According to this, it is possible not only to substitute the filtering apparatus of the invention for a conventional sedimentation basin, but also to sufficiently remove turbid materials. If such an upward-type filtering apparatus is provided upstream of the slow sand filter bed or rapid sand filter bed, it is possible to obtain an effect that the filter bed is less prone to be clogged. Since it is unnecessary to add a chemical agent to raw water, it is possible to reduce the cost and eventually, it is possible to obtain delicious purified water. According to the other invention, in the upward-type filtering apparatus according to claim 1 or 2, a minimum particle layer of the filtering portions comprise a layer of filtering sands having particle diameters of 1 to 50 µm. Then, it is possible to remove minute turbid materials, and to substantially completely remove *cryptosporidium*. For example, if water which was filtered by the slow sand filter bed, the rapid sand filter bed or other filtering apparatus is filtered by such a filtering apparatus, it is possible to ensure that safe purified water is obtained.

According to the other invention, in the upward-type filtering apparatus according to any one of claims 1 to 5, a lower portion of the pressure container is provided with a to-be filtered water supply pipe having a supply pipe valve and with a drain pipe having a drain pipe valve, an upper portion of the pressure container is provided with a water pipe having a water pipe valve, a large number of holes are formed in a washing pipe, the washing pipe is embedded in a layer which is adjacent to a lower side of the minimum particle layer of the filtering portion, if the supply pipe valve and the water pipe valve are opened and the drain pipe valve is closed, and if to-be filtered water is supplied from the to-be filtered water supply pipe, filtered water which was filtered by the filtering material is supplied from the water pipe into outside, and if the supply pipe valve and the water pipe valve are closed and the drain pipe valve is opened, and if to-be filtered water is supplied from the washing pipe, the filtering material is washed with the to-be filtered water and the to-be filtered water is drained from the drain pipe. That is, it is possible to efficiently wash a portion of the filtering material where turbid materials are most prone to be accumulated, and washing drain is discharged from the lower portion and is not discharged from the upper portion. That is, it is possible to safely wash the filtering material without contaminating the filtered water. Since the wash is carried out using to-be filtered water, it is unnecessary to separately prepare washing water. According to the other invention, According to an invention described in claim 7, in a filtering apparatus in which first and second upward-type filters each comprising the upward-type filtering apparatus according to any one of claims 1 to 5 are combined, if filtered water is supplied from upper portions of the first and second upward-type filters, the filtering materials are back washed and washing water is drained from lower portions of the first and second upward-type filters, a lower portion of the first upward-type filter is provided with a first to-be filtered water supply pipe having a first supply pipe valve and with a first drain pipe having a first drain pipe valve, an upper portion of the first upward-type filter is provided with a first water pipe, a lower portion of the second upward-type filter is provided with a second to-be filtered water supply pipe having a second supply pipe valve and with a second drain pipe having a second drain pipe valve, an upper portion of the second upward-type filter is provided with a second water pipe, to-be filtered water is supplied from the first and second to-be filtered water supply pipes under water pressure of 0.05 MPa or higher, the first and second water pipes are in communication with each other, and a water main pipe having a water main pipe valve is connected to the first and second water pipes. Therefore, as will be described in detail later, it is possible to filter to-be filtered water using the first and second upward-type filters at the same time, or it is possible to back wash one of the upward-type filters using filtered water which was filtered by the other upward-type filter. At that time, there is an effect that it is unnecessary to separately store purified water for the back washing, and a pump for the back washing is not required.

MODES FOR CARRYING OUT THE INVENTION

Figure 1:
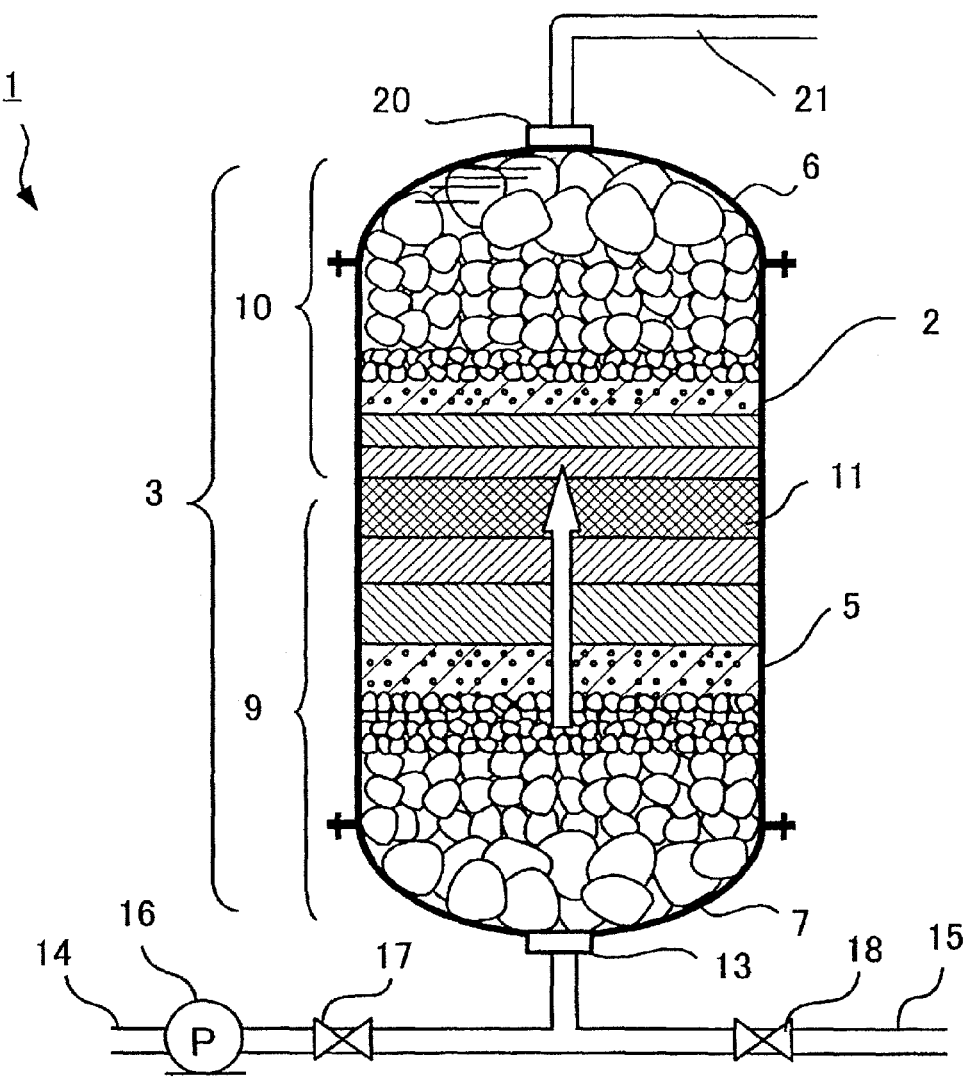
FIG. 1 is a schematic side sectional view of an upward-type filtering apparatus according to an embodiment of the present invention.

An upward-type filtering apparatus according to an embodiment will be described below. As shown in FIG. 1, the upward-type filtering apparatus 1 includes a hollow pressure container 2 having a predetermined shape, and a filtering material 3 provided in the pressure container 2. The pressure container 2 has a steel plate having predetermined a thickness, and the pressure container 2 includes a cylindrical barrel 5, a domical head 6 which is liquid-tightly mounted on an upper portion of the barrel 5, and a domical bottom 7 which is liquid-tightly mounted on a lower portion of the barrel 5. Since the pressure container 2 has such a shape, the pressure container 2 is highly resistant to internal pressure. Since the pressure container 2 can easily be disassembled, it is possible to do maintenance on the filtering material 3, and to replace internal parts.

The upward-type filtering apparatus 1 of the embodiment of the invention is characterized in a laminating method of the filtering material 3. If the filtering material 3 is viewed from its function, the filtering material 3 can be divided into a lower filtering portion 9 through which water is filtered, and a filtering sand flowing-out preventing portion 10 which is laminated on the filtering portion 9 to hold particles which constitute the filtering portion 9 so that the particles do not soar in the water. The filtering portion 9 includes a plurality of layers which are laminated on one another such that their particle diameters become smaller from a lower layer toward an upper layer of the filtering portion 9. The filtering sand flowing-out preventing portion 10 is laminated on the filtering portion 9, and includes a plurality of layers which are laminated on one another such that their particle diameters become larger from a lower layer toward an upper layer of the filtering sand flowing-out preventing portion 10. That is, a minimum particle layer 11 is disposed in an intermediate portion of the filtering material 3 and sandwiched between upper and lower layers having large particle diameters. Since the particle diameters of the filtering portion 9 become smaller in a direction in which to-be filtered water flows, the filter is less prone to be clogged, and since the filtering sand flowing-out preventing portion 10 is provided, this prevents particles of the filtering portion 9 from flowing outside. In this embodiment, the filtering material 3 laminated in this manner is charged such that the filtering material 3 reaches a ceiling, i.e., a head 6 of the pressure container 2. Since the filtering material 3 is formed as described above, even if predetermined water pressure is applied to to-be filtered water, the filtering material 3 is prevented from floating up or from soaring. In the upward-type filtering apparatus 1 of the embodiment, the filtering material 3 does not soar in water not only at the time of filtering but also at the time of washing, and the laminated state is maintained.

The pressure container 2 is provided at its lower end 13 with a to-be filtered water supply pipe 14 through which water is supplied into the pressure container 2, and with an outlet pipe 15 through which washing drain after washing the filtering material 3 is drained to outside. In reality, these pipes 14 and 15 are coupled to each other as a common pipe, and this common pipe is connected to the lower end 13 of the pressure container 2. A pump 16 which supplies to-be filtered water under water pressure of 0.05 MPa or higher and a supply pipe valve 17 are provided in the to-be filtered water supply pipe 14. A drain pipe valve 18 is provided in the drain pipe 15. A water pipe 21 through which filtered water is sent to outside is connected to an upper end 20 of the pressure container 2.

An operation of the upward-type filtering apparatus 1 according to the embodiment will be described. In the upward-type filtering apparatus 1, the supply pipe valve 17 is opened and the drain pipe valve 18 is closed. The pump 16 is operated and to-be filtered water is supplied under water pressure of 0.05 MPa or higher. According to this, the to-be filtered water is supplied from a lower portion of the pressure container 2, and flows in the filtering portion 9 of the filtering material 3 upward. Turbid materials included in the to-be filtered water are captured in the layers of the filtering portion 9 in accordance with the particle diameters. Therefore, the to-be filtered water is filtered by the entire filtering portion 9, and turbid materials are not centered only in a particular layer. The filtered water flows upward through the filtering sand flowing-out preventing portion 10 and is sent out from an upper portion of the pressure container 2 through the water pipe 21. Since the to-be filtered water is sent by the pump 16 under pressure, even if turbid materials are accumulated in the filtering portion 9, the to-be filtered water can stably be filtered. If a large amount of turbid materials are accumulated in the filtering material 3, the filtering material 3 is washed. More specifically, the pump 16 is stopped and the supply pipe valve 17 is closed. The drain pipe valve 18 is opened. In this state, purified water is reversely sent from the water pipe 21 under pressure. According to this, the purified water flows downward through the filtering material 3. Turbid materials are washed away downward by the purified water but since specific gravity of the turbid materials is generally greater than that of water, the turbid materials flow downward smoothly. That is, the filtering material 3 is washed. Water including the turbid materials is drained through the drain pipe 15.

The upward-type filtering apparatus 1 of the embodiment has a variety of potential applications, and appropriate filtering material is selected as the filtering material 3 in accordance with uses. For example, when the upward-type filtering apparatus 1 is used as an upward-type filtering apparatus which filters raw water obtained from river or the like and removes only turbid materials having relatively large particle diameters, an uppermost layer of the filtering portion 9, i.e., the minimum particle layer 11 is formed as a layer of filtering sands having particle diameters of 0.1 to 0.5 mm. If raw water is filtered by the filtering material 3 having such a filtering portion 9, even if turbidity of the raw water is 100 or higher, the turbidity of the filtered water is lowered to about 10. For example, if raw water is filtered by the upward-type filtering apparatus 1 of the embodiment before the raw water is treated by the slow sand filter bed and the rapid sand filter bed, there is an effect that the slow sand filter bed and the rapid sand filter bed are less prone to be clogged. The upward-type filtering apparatus 1 can be used as an upward-type filtering apparatus which removes *cryptosporidium*. In this case, a layer of particles having particle diameters of 1 to 50 μm is provided as the minimum particle layer 11 of the filtering portion 9. As such particles, it is possible to use ceramic particles, metal particles or glass particles for example. If the filtering material 3 is formed as described above, since it is possible to reliably remove the *cryptosporidium*, the upward-type filtering apparatus 1 can be used for further treating water which was once filtered by the filtering apparatus, the slow sand filter bed or the rapid sand filter bed. The upward-type filtering apparatus 1 can be used as a filtering apparatus which can effectively decompose organic matter. More specifically, the minimum particle layer 11 of the filtering portion 9 is made of diatomaceous earth. Particles forming the diatomaceous earth have a feature that since minute holes are formed in the particles forming the diatomaceous earth, a surface area thereof is large. According to this, aerobic bacteria are prone to breed, organic matter in the to-be filtered water is appropriately decomposed and it is possible to obtain delicious purified water.

Figure 2:
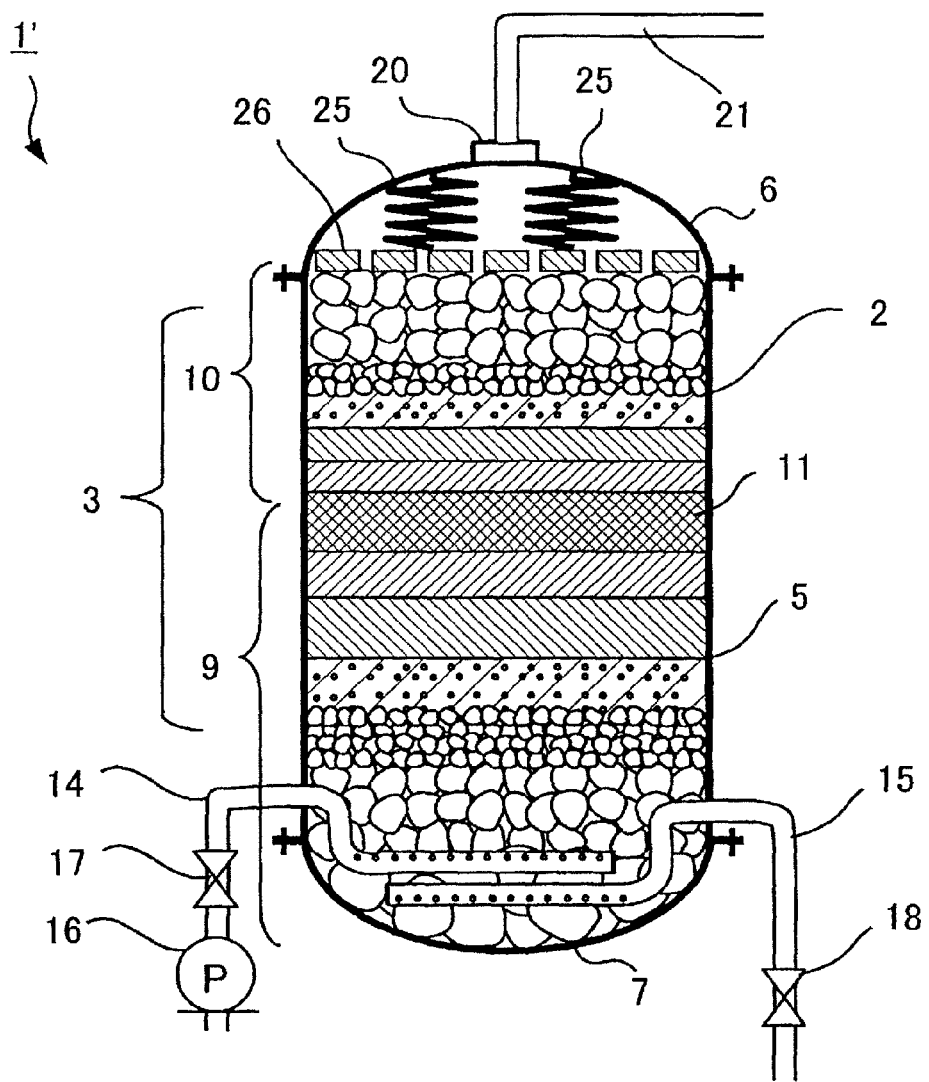
FIG. 2 is a schematic side sectional view of an upward-type filtering apparatus according to another embodiment of the invention.

FIG. 2 shows an upward-type filtering apparatus 1' according to a second embodiment. The upward-type filtering apparatus 1' of the second embodiment is a filtering apparatus obtained by deforming the upward-type filtering apparatus 1 of the first embodiment, members having similar operations are designated with the same symbols and explanation thereof will be omitted. The upward-type filtering apparatus 1' of the second embodiment is different from the upward-type filtering apparatus 1 of the first embodiment in the following points. A first different point is that the filtering material 3 is not charged such that the filtering material 3 reaches the ceiling of the pressure container 2. In the second embodiment, a retainer plate 26 is provided on the filtering material 3, and the retainer plate 26 is biased downward by springs 25 and 25. According to this, the filtering material 3 is pressed downward. A large number of holes are formed in the retainer plate 26, filtered water can pass through the holes but gravels constituting the uppermost layer the filtering sand flowing-out preventing portion 10 can not pass through the holes. In the second embodiment also, to-be filtered water is sent into the pressure container 2 under water pressure of 0.05 MPa or higher, but the retainer plate 26 prevents the filtering material 3 from floating up. A second different point is that the to-be filtered water supply pipe 14 and the outlet pipe 15 are separately pulled into the pressure container 2 and are embedded into a lower layer of the filtering portion 9. A large number of holes through which to-be filtered water and drain pass are formed in the pipes 14 and 15. A person skilled in the art can easily understand that the upward-type filtering apparatus 1' of the second embodiment exerts the same effect as that of the upward-type filtering apparatus 1 of the first embodiment. In the upward-type filtering apparatus 1' of the second embodiment, the filtering material 3 is pressed downward by the retainer plate 26 which is biased by the springs 25 and 25. Alternatively, the filtering material 3 may be pressed downward by a predetermined weight. Here, the member which presses down the filtering material 3 is not limited to the retainer plate 26 biased by the springs 25, and any member can be used only if it is possible to prevent the filtering material 3 from floating up against water pressure of supplied to-be filtered water.

Figure 3:
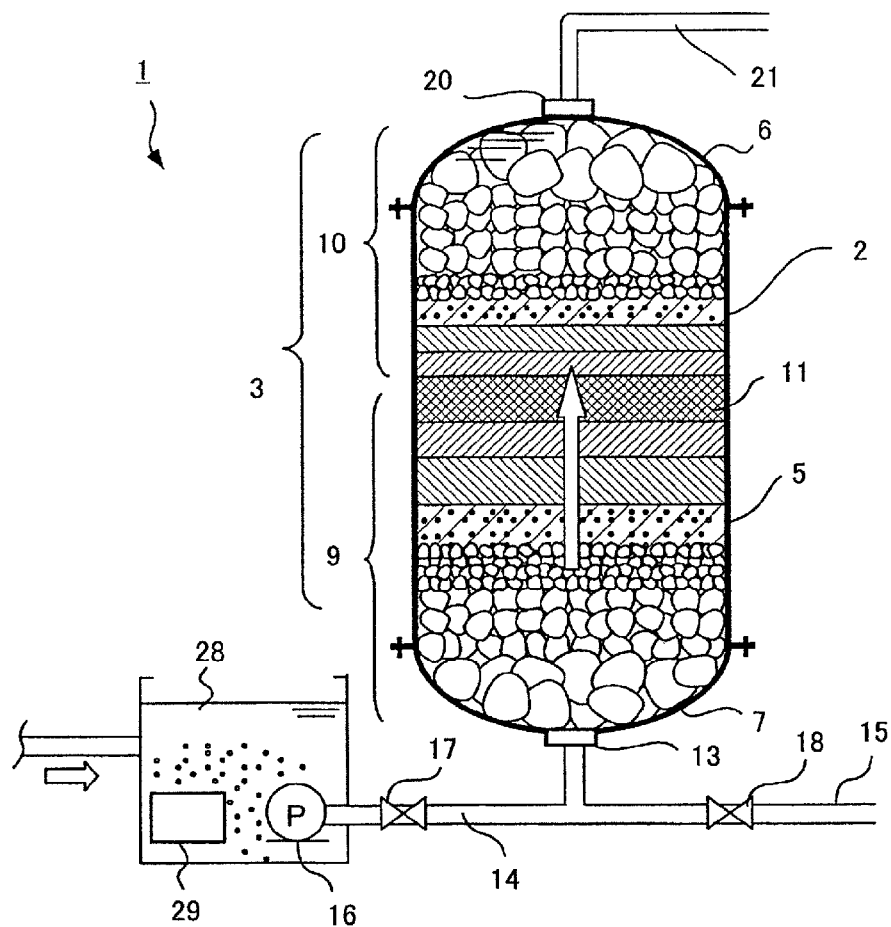
FIG. 3 is a schematic side sectional view of the upward-type filtering apparatus and minute air bubbles generating apparatus which mixes minute air bubbles into to-be filtered water according to the embodiment of the invention.

In the upward-type filtering apparatus 1 or the upward-type filtering apparatus 1' of the embodiments, the to-be filtered water to be supplied can also be deformed. That is, bactericidal agent such as sodium hypochlorite may be mixed into the to-be filtered water which is supplied to the upward-type filtering apparatus 1 or chemical agent may not be mixed into the to-be filtered water. When sodium hypochlorite is mixed into the to-be filtered water and the to-be filtered water is supplied to the upward-type filtering apparatus 1, since microbes do not breed in the filtering material 3, there is an effect that the filtering material 3 is less prone to be clogged over the long term. When chemical agent is not mixed and to-be filtered water is supplied to the upward-type filtering apparatus 1, microbes breed in the filtering material 3 and biological films are formed. In this case, there is an effect that organic matter is decomposed by the biological films. The microbes of the biological films are aerobic, but if the amount of oxygen included in the to-be filtered water is small, biological films are only thinly formed and organic matter can not sufficiently be decomposed. If sufficient oxygen is mixed into the to-be filtered water and the to-be filtered water is supplied to the upward-type filtering apparatus 1, biological films are thickly formed and organic matter is efficiently decomposed. FIG. 3 shows the upward-type filtering apparatus 1 which exerts such an operation. In this configuration, a minute air bubbles generating tank 28 is provided upstream of the upward-type filtering apparatus 1, and a minute air bubbles generating apparatus 29 which generates air bubbles of 80 μm or less is provided in the minute air bubbles generating tank 28. A turning-type minute air bubbles generating apparatus described in Japanese Patent Publication No. 3397154 (JP3397154) can be employed as the minute air bubbles generating apparatus 29 for example. The pump 16 which sends to-be filtered water to the to-be filtered water supply pipe 14 under pressure is also provided in the minute air bubbles generating tank 28. According to this configuration, to-be filtered water is once sent into the minute air bubbles generating tank 28, and air bubbles of 10 to 80 μm are mixed into the to-be filtered water by the minute air bubbles generating apparatus 29 such that air bubbles exist 200/mL or more. The to-be filtered water including minute air bubbles is supplied to the upward-type filtering apparatus 1 through the pump 16 and the to-be filtered water supply pipe 14. Since the air bubbles are sufficiently minute, the air bubbles flow through the filtering material 3 together with the to-be filtered water and the air bubbles do not hinder the filtering operation. Since the to-be filtered water includes sufficient oxygen, biological films made of aerobic bacteria are thickly formed in the filtering material 3. Therefore, organic matter in the to-be filtered water is efficiently decomposed.

Figure 4:
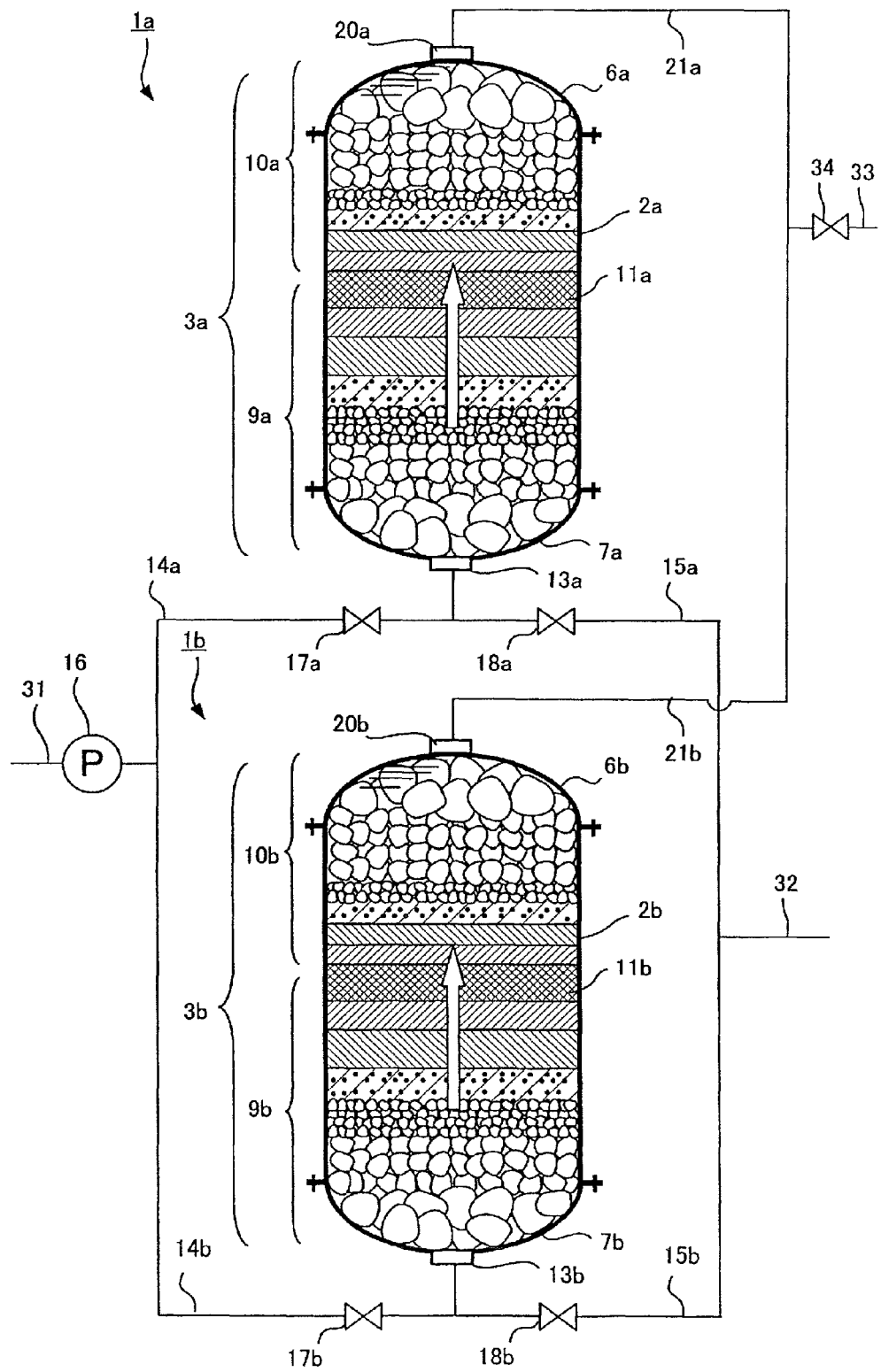
FIG. 4 is a schematic side sectional view of a state where two upward-type filtering apparatuses according to the embodiment of the invention are combined by means of a predetermined pipe.

Next, an upward-type filtering apparatus in which the filtering material 3 can easily be washed will be described. An example which will firstly be described is a filtering apparatus in which two upward-type filtering apparatuses 1a and 1b of the embodiment are combined, and is shown in FIG. 4. Here, "a" is added to symbols of members which belong to the first upward-type filtering apparatus 1a, and "b" is added to symbols of members which belong to the second upward-type filtering apparatus 2b. First and second to-be filtered water supply pipes 14a and 14b supply to-be filtered water to the first and second upward-type filtering apparatuses 1a and 1b, respectively. The first and second to-be filtered water supply pipes 14a and 14b are branched off from the to-be filtered water supply main pipe 31 which is one pipe, and the pump 16 is provided in the to-be filtered water supply main pipe 31. First and second supply pipe valves 17a and 17b are provided in the first and second to-be filtered water supply pipes 14a and 14b, respectively. First and second drainpipes 15a and 15b are connected to the first and second upward-type filtering apparatuses 1a and 1b, respectively, and first and second drain pipe valves 18a and 18b are provided in the first and second drain pipes 15a and 15b, respectively, and the first and second drain pipes 15a and 15b merge with a drainage main pipe 32. First and second water pipes 21a and 21b are connected to the first and second upward-type filtering apparatuses 1a and 1b, respectively and are in communication with each other, and are connected to a water main pipe 33. A water main pipe valve 34 is provided in the water main pipe 33.

Figure 5:
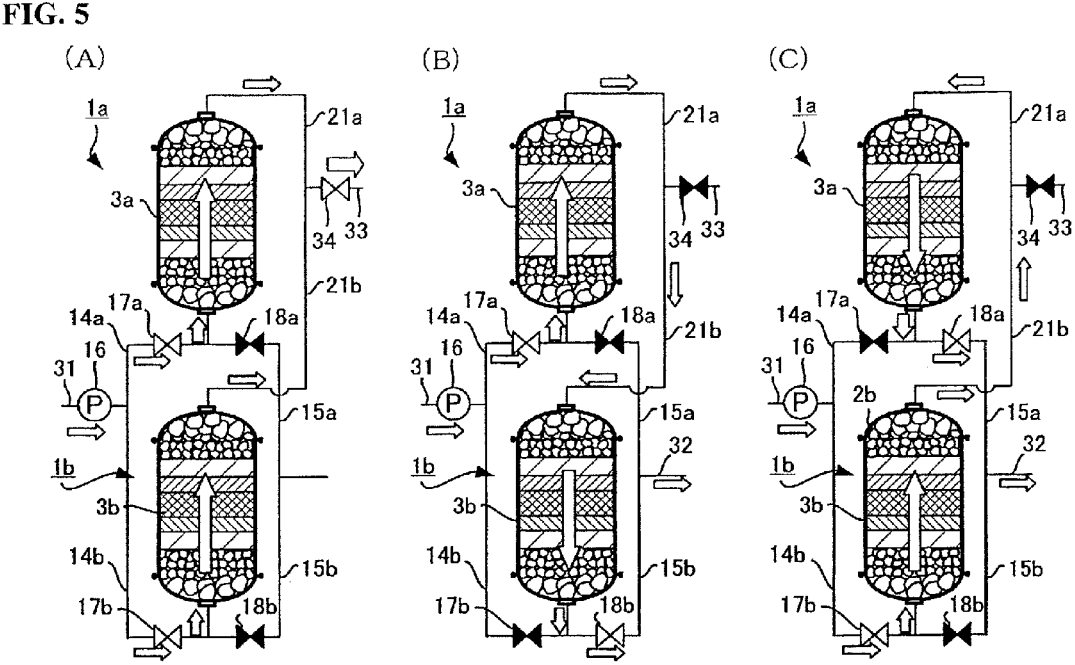
FIG. 5 are schematic diagrams for explaining operation of an apparatus including two upward-type filtering apparatuses according the embodiment of the invention, wherein (A) to (C) are side sectional views showing various operating methods.

An operation of the filtering apparatus including the combination of the two upward-type filtering apparatuses 1a and 1b will be described. First, to-be filtered water is filtered in the following manner. That is, the first and second supply pipe valves 17a and 17b and the water main pipe valve 34 are opened, and the first and second drain pipe valves 18a and 18b are closed. In FIG. 5(A), the opened state is shown in white color and the closed state is shown in black color. The pump 16 is operated. To-be filtered water is supplied from the first and second to-be filtered water supply pipes 14a and 14b to the first and second upward-type filtering apparatuses 1a and 1b. The to-be filtered water is upward filtered through the filtering materials 3a and 3b and is sent outside from the first and second water pipes 21a and 21b through the water main pipe 33.

If predetermined filtering time is elapsed, one of the first and second upward-type filtering apparatuses 1a and 1b is back washed and the filtering materials 3a and 3b are washed. When the second upward-type filtering apparatus 1b is to be washed, as shown in FIG. 5(B), the first supply pipe valve 17a and the second drain pipe valve 18b are opened, and the second supply pipe valve 17b, the first drain pipe valve 18a and the water main pipe valve 34 are closed. According to this, to-be filtered water is supplied from the first to-be filtered water supply pipe 14a to the first upward-type filtering apparatus 1a and is filtered, and the filtered water is sent from the first water pipe 21a to the second water pipe 21b. The sent filtered water is supplied to the second upward-type filtering apparatus 1b, and flows through the filtering material 3b downward. That is, the filtered water back washes the filtering material 3b. Turbid materials which are accumulated in the filtering material 3b flow downward together with filtered water and are drained from the second drain pipe 15b, and are drained to outside through the drainage main pipe 32. On the other hand, when the first upward-type filtering apparatus 1a is to be washed, as shown in FIG. 5(C), the second supply pipe valve 17b and the first drain pipe valve 18a are opened, the first supply pipe valve 17a, the second drain pipe valve 18b and the water main pipe valve 34 are closed. According to this, to-be filtered water is supplied from the second supply pipe valve 17b to the second upward-type filtering apparatus 1b and is filtered, and the filtered water is sent from the second water pipe 21b to the first water pipe 21a. The filtering material 3a of the first upward-type filtering apparatus 1a is back washed with the sent filtered water, the washing water is drained from the first drain pipe 15a and is drained to outside through the drainage main pipe 32.

If the back washing operation is completed, the first and second supply pipe valves 17a and 17b and the water main pipe valve 34 are opened, and the first and second drain pipe valves 18a and 18b are closed. If the pump 16 is operated, it is possible to filter water again. If the valves 17a, 17b, 18a are operated by a predetermined controller having a timer, it is possible to automatically and periodically back wash. If the first and second upward-type filtering apparatuses 1a and 1b are combined in this manner, not only it is possible to wash easily but also there is no need to store washing purified water.

Figure 6:
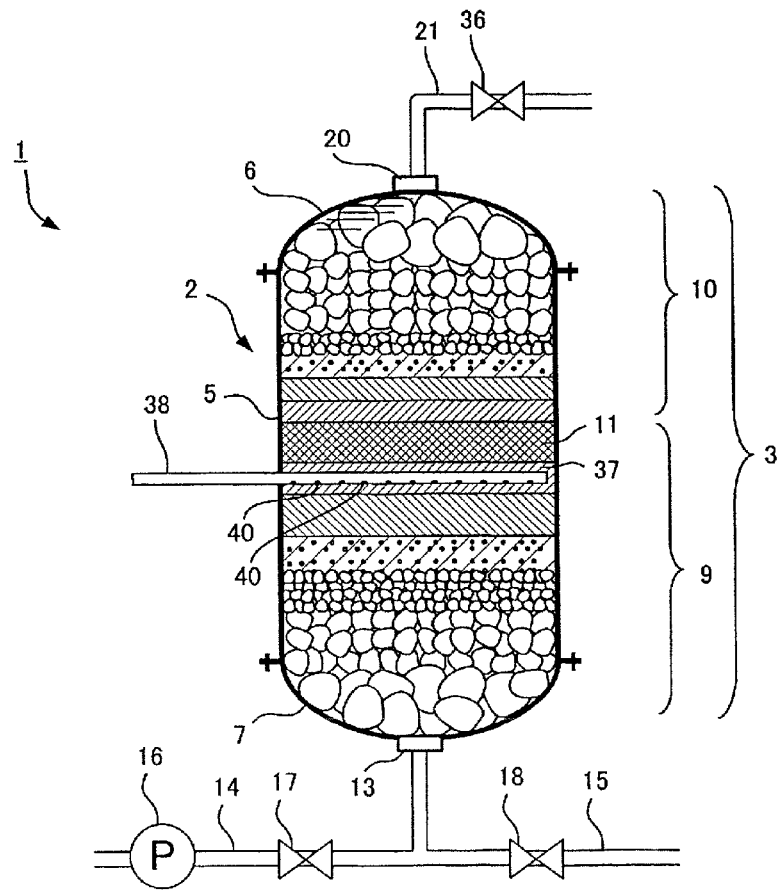
FIG. 6 is a schematic side sectional view of an upward-type filtering apparatus according to another embodiment of the invention.

Next, as an example of an upward-type filtering apparatus capable of easily washing the filtering material 3, an upward-type filtering apparatus 1c according to a third embodiment capable of washing the filtering material 3 with to-be filtered water will be described. The upward-type filtering apparatus 1c of the third embodiment has a configuration similar to the upward-type filtering apparatus 1 of the first embodiment. As shown in FIG. 6, members exerting the same operation as those of the upward-type filtering apparatus 1 of the first embodiment are designated with the same symbols. A washing pipe 38 through which to-be filtered washing water is supplied to the filtering portion 9 of the filtering material 3 is embedded in the upward-type filtering apparatus 1c of the third embodiment. More specifically, the washing pipe 38 is embedded in a layer under the minimum particle layer 11 of the filtering portion 9 which is in adjacent to the minimum particle layer 11. A large number of small-diameter holes 40 are formed in the washing pipe 38, and to-be filtered water is injected into the filtering material 3 through the holes 40 but particles constituting the layer 37 can not enter the washing pipe 38 from the holes 40. In the third embodiment, a water pipe valve 36 is provided in the water pipe 21.

Figure 7:
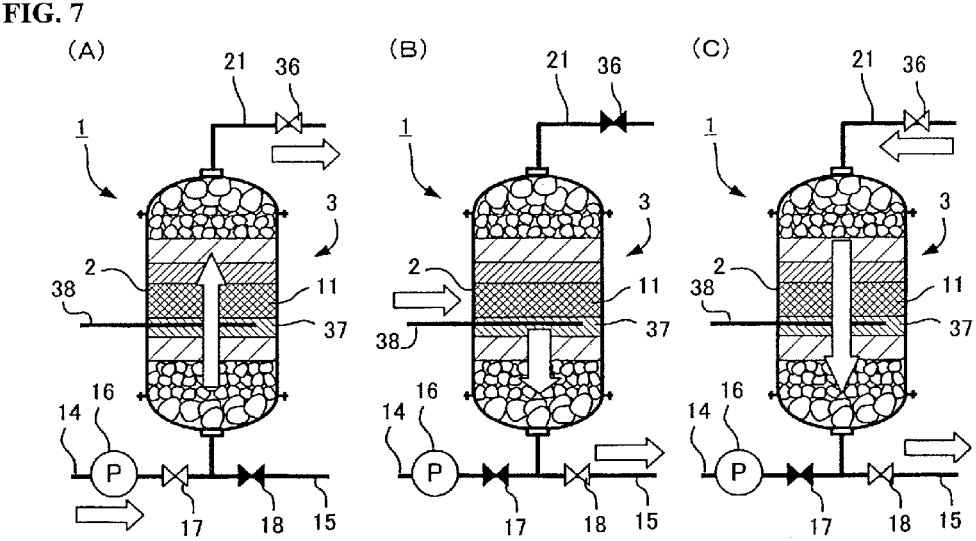
FIG. 7 are schematic diagrams for explaining operation of an upward-type filtering apparatus according another embodiment of the invention, wherein (A) to (C) are side sectional views showing various operating methods.

An operation of the upward-type filtering apparatus 1c of the third embodiment will be described. When to-be filtered water is to be filtered, as shown in FIG. 7(A), the supply pipe valve 17 and the water pipe valve 36 are opened. The drain pipe valve 18 is closed. The pump 16 is operated. Then, to-be filtered water is supplied from the to-be filtered water supply pipe 14 to the pressure container 2 under water pressure of 0.05 MPA or higher. The to-be filtered water flows upward through the filtering material 3, and is filtered and the filtered water is sent from the water pipe 21 to outside. If turbid materials are accumulated in the filtering material 3, the filtering efficiency is deteriorated. The filtering material 3 is washed in the following manner. That is, the pump 16 is stopped and the supply pipe valve 17 and the water pipe valve 36 are closed as shown in FIG. 7(B). The drainpipe valve 18 is opened. Next, to-be filtered water is supplied from the washing pipe 38 under water pressure of 0.05 MPa or higher for example. According to this, to-be filtered water supplied from the washing pipe 38 flows through the filtering portion 9 downward. At that time, turbid materials accumulated in the filtering portion 9 also flow downward together with raw water. That is, the filtering portion 9 is washed. Most of turbid materials are accumulated in the minimum particle layer 11, the layer 37 under the minimum particle layer 11 and in the vicinity thereof, but since the washing to-be filtered water is injected to the layer 37, it is possible to efficiently wash the filtering portion 9. Further, since the water pipe valve 36 is closed, the washing to-be filtered water does not flow to a location higher than the filtering sand flowing-out preventing portion 10. That is, washing drain after the washing operation flows only downward. The washing drain is drained to outside through the outlet pipe 15. If the washing operation is completed, the filtering operation can be resumed. However, even if the washing operation is repeated by this method, if minute turbid materials are accumulated in the minimum particle layer 11, the filtering efficiency is gradually deteriorated. In such a case, the filtering material 3 is washed in the following manner. A predetermined amount of filtered water which was filtered by the upward-type filtering apparatus 1c is stored in an external tank or the like. The pump 16 is stopped and the supply pipe valve 17 is closed as shown in FIG. 7(C). The water pipe valve 36 and the drain pipe valve 18 are opened. The stored filtered water is supplied from the water pipe 21 into the pressure container 2 under predetermined water pressure. According to this, the filtered water flows through the filtering material 3 downward and at that time, turbid materials in the filtering material 3 are also washed away downward. That is, the filtering material 3 can be washed. Washing drain after the wash is drained to outside through the outlet pipe 15.

First Experiment

In the upward-type filtering apparatus 1 in which the minimum particle layer 11 is made of particles having particle diameters of 1 to 50 μm, to make sure that to-be filtered water is reliably filtered and *cryptosporidium* is reliably removed, the following experiments were carried out.

A. Conditions:
(1) Shape of the pressure container 2: circular having radius of 4 cm
Area of cross section: radii 4 cm×4 cm×3.14=50.24 cm$^2$
(2) Minimum particle layer 11: thickness of 10 mm: ceramic particles of particle diameters of 1 to 50 μm
A product "ceramicsand" produced by Yugenkaisha Takeori Kougyousho was used as the ceramic particles
(3) Water pressure of to-be filtered water: 0.1 MPa
B. Experiment:
Tap water was poured into an experimental water tank, a predetermined amount of pseudo particles of *cryptosporidium* were added and they were stirred sufficiently. Then, the water in the water tank was pressurized by the pump 16, the water was sent to the upward-type filtering apparatus 1 under pressure and filtered. As the pseudo particles of *cryptosporidium*, a product "cryptracer" (registered trademark) produced by Nihon Koken Kogyo Co., LTD. and Japan water research center was used.
C. Result:
(1) Filtered water was checked, and the pseudo particles of *cryptosporidium* were not found. It could be confirmed that the *cryptosporidium* could completely be removed.
(2) At that time, water of 7,573 cm$^3$ was filtered for 6 minutes. The filtering speed was 7,573 cm$^3$/50.24 cm$^2$/6 minutes=25 cm/minute. Therefore, the filtering speed is 25 cm/minute=15 m/h=360 m/day.

Second Experiment

A test was carried out under the same conditions as those of the first experiment except that water pressure of to-be filtered water was set to 0.05 MPa.
C. Result:
(A) The pseudo particles of *cryptosporidium* were not found.
(B) Filtering speed/h or day was as follows: 168 m/day
It could be confirmed that in the upward-type filtering apparatus 1 in which the minimum particle layer 11 was made of particles of particle diameters of 1 to 50 μm, to-be filtered water was reliably filtered, and *cryptosporidium* was reliably removed.

EXPLANATION OF SYMBOLS 1 upward-type filtering apparatus
2 pressure container
3 filtering material
5 barrel
6 head
7 bottom
9 filtering portion
10 filtering sand flowing-out preventing portion
11 minimum particle layer
14 to-be filtered water supply pipe
15 drain pipe
16 pump
17 supply pipe valve
18 drain pipe valve
21 water pipe
26 retainer plate
28 minute air bubbles generating tank
29 minute air bubbles generating apparatus
38 washing pipe

The invention claimed is:
1. An upward-type filtering apparatus, comprising:
a pressure container that defines a rigid ceiling, an outlet port located in the ceiling, and filtering material which is placed in the pressure container and which is made of gravels, filtering sands and particles, in which to-be filtered water is supplied from a lower portion of the pressure container and is filtered upward, and filtered water is obtained from an upper portion of the pressure container via the outlet port, wherein the filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion, wherein the filtering material is charged into the pressure container such that an entire volume of the pressure container is filled with the filtering material and an upper layer of the filtering sand flowing-out preventing portion of the filtering material reaches the ceiling of the pressure container, and wherein the to-be filtered water can be supplied into the lower portion of the pressure container under a water pressure of 0.05 MPa or higher.

2. The upward-type filtering apparatus according to claim 1, wherein a minimum particle layer of the filtering portion comprises a layer of filtering sands having particle diameter of 0.1 to 0.5 mm.

3. The upward-type filtering apparatus according to claim 1, wherein a minimum particle layer of the filtering portion comprises a layer of filtering sands having particle diameters of 1 to 50 μm.

4. The upward-type filtering apparatus according to claim 1, wherein a tank containing a generator for generating air bubbles of diameters of 80 μm or less is provided to mix air bubbles into the to-be filtered water to be supplied to the lower portion of the pressure container.

5. The upward-type filtering apparatus according to claim 1, wherein the lower portion of the pressure container is provided with a to-be filtered water supply pipe having a supply pipe valve and with a drain pipe having a drain pipe valve, wherein the outlet port in the upper portion of the pressure container is provided with a water pipe having a water pipe valve, a large number of holes are formed in a washing pipe, the washing pipe is embedded in a layer which is adjacent to a lower side of a minimum particle layer of the filtering portion, if the supply pipe valve and the water pipe valve are opened and the drain pipe valve is closed, and if to-be filtered water is supplied from the to-be filtered water supply pipe, filtered water which was filtered by the filtering material is supplied from the water pipe into outside, and if the supply pipe valve and the water pipe valve are closed and the drain pipe valve is opened, and if to-be filtered water is supplied from the washing pipe, the filtering material is washed with the to-be filtered water and the to-be filtered water is drained from the drain pipe.

6. A filtering apparatus in which first and second upward-type filters each comprising the upward-type filtering apparatus according to claim 1 are combined, wherein the lower portion of the first upward-type filter is provided with a first to-be filtered water supply pipe having a first supply pipe valve and with a first drain pipe having a first drain pipe valve, and the outlet port in the upper portion of the first upward-type filter is provided with a first water pipe, the lower portion of the second upward-type filter is provided with a second to-be filtered water supply pipe having a second supply pipe valve and with a second drain pipe having a second drain pipe valve, and the outlet in the upper portion of the second upward-type filter is provided with a second water pipe, to-be filtered water can be supplied from the first and second to-be filtered water supply pipes under water pressure of 0.05 MPa or higher, the first and second water pipes are in communication with each other, and a water main pipe having a water main pipe valve is connected to the first and second water pipes, and if filtered water is supplied from the upper portion of one of the first and second upward-type filters, the filtering material of the other upward-type filter is back washed and washing water is drained from the lower portion of the other upward-type filter.

7. An upward-type filtering apparatus: comprising:

a pressure container defining a rigid ceiling, an outlet port located in the ceiling, and filtering material which is placed in the pressure container and which is made of gravels, filtering sands and particles, in which to-be filtered water is supplied from a lower portion of the pressure container and is filtered upward, and filtered water is obtained from an upper portion of the pressure container via the outlet port, wherein the filtering material comprises a filtering portion including a plurality of layers which are laminated on one another such that particle diameters thereof are gradually reduced from a lower portion toward an upper portion of the filtering portion, and a filtering sand flowing-out preventing portion including a plurality of layers which are located on the filtering portion and which are laminated on one another such that particle diameters thereof are gradually increased from a lower portion toward an upper portion of the filtering sand flowing-out preventing portion, wherein the to-be filtered water can be supplied into the lower portion of the pressure container under water pressure of 0.05 MPa or higher, a retainer plate having a plurality of holes positioned below the outlet port, wherein the retainer plate is in contact with an upper layer of the filtering sand flowing-out preventing portion of the filtering material, and wherein the plurality of holes have a size that is smaller than a size of particles of the upper layer of the filtering sand flowing-out preventing portion of the filtering material, and a plurality of springs disposed between the ceiling and the retainer plate for forcibly pressing down the retainer plate against the upper layer of the filtering sand flowing-out preventing portion of the filter material so as to suppress a case where the filtering material floats up by water pressure.

8. The upward-type filtering apparatus according to claim 7, wherein a tank containing a generator for generating air bubbles of diameters of 80 μm or less is provided to mix air bubbles into the to-be filtered water to be supplied to the lower portion of the pressure container.

9. The upward-type filtering apparatus according to claim 7, wherein the lower portion of the pressure container is provided with a to-be filtered water supply pipe having a supply pipe valve and with a drain pipe having a drain pipe valve, wherein the outlet port in the upper portion of the pressure container is provided with a water pipe having a water pipe valve, a large number of holes are formed in a washing pipe, the washing pipe is embedded in a layer which is adjacent to a lower side of a minimum particle layer of the filtering portion, if the supply pipe valve and the water pipe valve are opened and the drain pipe valve is closed, and if to-be filtered water is supplied from the to-be filtered water supply pipe, filtered water which was filtered by the filtering material is supplied from the water pipe into outside, and if the supply pipe valve and the water pipe valve are closed and the drain pipe valve is opened, and if to-be filtered water is supplied from the washing pipe, the filtering material is washed with the to-be filtered water and the to-be filtered water is drained from the drain pipe.

10. A filtering apparatus in which first and second upward-type filters each comprising the upward-type filtering apparatus according to claim 7 are combined, wherein the lower portion of the first upward-type filter is provided with a first to-be filtered water supply pipe having a first supply pipe valve and with a first drain pipe having a first drain pipe valve, and the outlet port in the upper portion of the first upward-type filter is provided with a first water pipe, the lower portion of the second upward-type filter is provided with a second to-be filtered water supply pipe having a second supply pipe valve and with a second drain pipe having a second drain pipe valve, and the outlet port in the upper portion of the second upward-type filter is provided with a second water pipe, to-be filtered water can be supplied from the first and second to-be filtered water supply pipes under water pressure of 0.05 MPa or higher, the first and second water pipes are in communication with each other, and a water main pipe having a water main pipe valve is connected to the first and second water pipes, and if filtered water is supplied from the upper portion of one of the first and second upward-type filters, the filtering material of the other upward-type filter is back washed and washing water is drained from the lower portion of the other upward-type filter.

11. The upward-type filtering apparatus according to claim 7, wherein a minimum particle layer of the filtering portion comprises a layer of filtering sands having particle diameter of 0.1 to 0.5 mm.

12. The upward-type filtering apparatus according to claim 7, wherein a minimum particle layer of the filtering portion comprises a layer of filtering sands having particle diameters of 1 to 50 μm.

* * * * *